(12) United States Patent
Ito

(10) Patent No.: US 11,579,570 B2
(45) Date of Patent: Feb. 14, 2023

(54) SERVO CONTROL DEVICE, SERVO CONTROL METHOD AND SERVO CONTROL SYSTEM

(71) Applicant: NIDEC SANKYO CORPORATION, Suwa-gun Nagano (JP)

(72) Inventor: Akihiro Ito, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 114 days.

(21) Appl. No.: 17/141,733

(22) Filed: Jan. 5, 2021

(65) Prior Publication Data
US 2021/0124314 A1    Apr. 29, 2021

Related U.S. Application Data

(62) Division of application No. 16/020,398, filed on Jun. 27, 2018, now Pat. No. 10,915,072.

(30) Foreign Application Priority Data

Jun. 28, 2017   (JP) .............................. JP2017-126242

(51) Int. Cl.
*G05B 11/42*    (2006.01)
*G05B 13/02*    (2006.01)
(Continued)

(52) U.S. Cl.
CPC ............ *G05B 11/42* (2013.01); *G05B 13/024* (2013.01); *G05B 19/0421* (2013.01);
(Continued)

(58) Field of Classification Search
CPC ......... G01S 19/21; G05B 19/19; G05B 11/42; G05B 13/024; G05B 19/0421; G05B 19/0426; B65H 2220/02
(Continued)

(56) References Cited

U.S. PATENT DOCUMENTS

| 6,219,376 B1 | 4/2001 | Zhodzishsky et al. |
| 6,590,734 B1 | 7/2003 | Ell |
| 2014/0117918 A1* | 5/2014 | Park ....................... G05B 19/19 318/611 |

FOREIGN PATENT DOCUMENTS

| JP | 2016035676 A | 3/2016 |
| JP | 2016035677 A | 3/2016 |

OTHER PUBLICATIONS

USPTO Non Final Office Action for corresponding U.S. Appl. No. 16/020,398; dated Jun. 23, 2020.
(Continued)

*Primary Examiner* — Muhammad S Islam
*Assistant Examiner* — Zemenay T Truneh
(74) *Attorney, Agent, or Firm* — Cantor Colburn LLP

(57) ABSTRACT

A servo control device to execute an operation in a discrete time system may include a velocity feedback path having a difference means calculating a pseudo-velocity from a detected position and a lowpass filter, and a PI control means executing a proportional integration control operation on a deviation between the pseudo-velocity and the position deviation to create a drive command for the driver. The velocity feedback path includes a first gain means applying a first gain to the pseudo-velocity, a delay means delaying the pseudo-velocity, and a second gain means applying a second gain to the delayed pseudo-velocity. A sum of an output of the first gain means and the second gain means is inputted to the lowpass filter, and "$F_a(z)=1/(1-z^{-1}F_b(z))$" is satisfied where a transfer function of the PI control means is $F_a(z)$, and a transfer function of the lowpass filter is $F_b(z)$.

6 Claims, 3 Drawing Sheets

(51) Int. Cl.
*G05B 19/042* (2006.01)
*G05B 19/19* (2006.01)

(52) U.S. Cl.
CPC ...... *G05B 19/0426* (2013.01); *B65H 2220/02* (2013.01); *G05B 19/19* (2013.01)

(58) Field of Classification Search
USPC .................................. 318/611, 609; 375/148
See application file for complete search history.

(56) References Cited

OTHER PUBLICATIONS

USPTO Notice of Allowance for corresponding U.S. Appl. No. 16/020,398; dated Oct. 7, 2020.

* cited by examiner

<PRIOR ART>

SERVO CONTROL DEVICE, SERVO CONTROL METHOD AND SERVO CONTROL SYSTEM

CROSS REFERENCE TO RELATED APPLICATION

The present application is a divisional of U.S. patent application No. 16/020,398, filed on Jun. 27, 2018, the entire contents pf which are incorporated herein by reference. The U.S. Ser. No. 16/020,358 application claimed the benefit of the date of the earlier Japanese Application No. 2017-126242 filed Jun. 28, 2017, the content of which are also incorporated herein by reference.

TECHNICAL FIELD

At least an embodiment of the present invention may relate to a servo control device and a servo control method in which position control of a motor or axis control of a robot is performed, and may relate to a servo control system which includes the servo control device.

BACKGROUND

In servo control in which a position command is given to control a position (rotation position) of a motor or an axis of a robot, "P-PI" (proportion/proportional integration) control is often used. For example, in a servo control device in which a rotation position of a motor is controlled by "P-PI" control, a rotation speed is obtained by differentiating a rotation position obtained by a position detection mechanism (encoder or the like) connected with the motor, and the rotation position and the rotation speed are fed back to perform proportional control ("P" control) on a deviation of the rotation position and proportional integration control ("PI" control) on a deviation of the rotation speed. In a servo control device, in order to perform stable control, it is necessary to appropriately set gains (for example, a position loop gain $K_p$, a speed loop gain $K_v$ and an integration gain $K_i$), filter elements (for example, a differential filter element and an integration filter element) and the like which are used in "P-PI" control. A gain and a filter element are commonly expressed by a transfer function. Therefore, a model is calculated from a behavior of a control system which includes a motor and its load, and the gain and the filter element used in the "P-PI" control can be determined based on respective model parameters structuring the model. The "P-PI" control is a superior technique which has robustness to disturbance and a load variation in performing the "PI" control.

When a load of a motor is varied, for example, in a case that inertia of an operation object connected with the motor as a load is varied or, in a case that disturbance is applied, in order to successively realize stable control while maintaining a command response characteristic in the "P-PI" control which is superior in robustness, it is necessary to vary the gain and the filter element which are used in the "P-PI" control according to the variation. The Patent Literature 1 (Japanese Patent Laid-Open No. 2016-035676) discloses that an inertia detecting means structured to detect inertia of an operation object and inertia of a motor is provided and, based on the inertia detected by the inertia detecting means, model parameters structuring an integral filter element and a differential filter element are obtained and, based on the obtained model parameters, the integral filter element and the differential filter element are adaptively varied. The Patent Literature 2 (Japanese Patent Laid-Open No. 2016-035677) discloses that an input to a motor and an output (in other words, position) from the motor are observed to estimate a motor gain element and a characteristic of a closed loop for performing "P-PI" control is matched with a desired transfer function.

However, in a method that a model is constructed for controlling a motor or a robot and "P-PI" control is performed based on the model, it is still difficult that the command response characteristic is adjusted to the desired characteristic (model). Further, when a degree affected by disturbance, in other words, robustness (disturbance characteristic) is adjusted, the command response characteristic is varied and, on the contrary, when the command response characteristic is adjusted, the robustness is varied.

SUMMARY

In view of the problem described above, at least an embodiment of the present invention may advantageously provide a servo control device and a servo control method which are easily capable of adjusting a command response characteristic to a desired characteristic while holding robustness and, in addition, the command response characteristic and the robustness are capable of being independently adjusted. Further, at least an embodiment of the present invention may advantageously provide a servo control system to which the servo control device is incorporated.

According to at least an embodiment of the present invention, there may be provided a servo control device structured to control a driver which operates an operation object on the basis of a position command and to execute an operation in a discrete time system. The servo control device includes a calculating means configured to calculate a position deviation based on a position command and a detected position which is negatively fed back, a velocity feedback path which includes at least a difference means, which calculates a pseudo-velocity from the detected position, and a lowpass filter, and a PI control means configured to execute a proportional integration control operation on a deviation between the pseudo-velocity inputted through the velocity feedback path and the position deviation to create a drive command for the driver. The velocity feedback path further includes a first gain means which applies a first gain H1 to the pseudo-velocity, a delay means which delays the pseudo-velocity, and a second gain means which applies a second gain H2 to the pseudo-velocity delayed by the delay means. A sum of an output of the first gain means and an output of the second gain means is inputted to the lowpass filter, and "$F_a(z)=1/(1-z^{-1}F_b(z))$" is satisfied, where a transfer function of the PI control means is $F_a(z)$, and a transfer function of the lowpass filter is $F_b(z)$.

According to at least an embodiment of the present invention, there may be provided a servo control method configured to execute calculations in a discrete time system and to control a driver configured to operate an operation object on the basis of a position command. The servo control method includes a calculation step in which a position deviation is calculated based on the position command and a detected position which is negatively fed back, a feedback step in which a pseudo-velocity is calculated from the detected position by a difference operation to feed back the pseudo-velocity, and a creation step in which a proportional integration control operation is executed on a deviation between the pseudo-velocity fed back and the position deviation to create a drive command for the driver. The feedback step includes a first gain applying step in which a first gain H1 is applied to the pseudo-velocity, a delay step in which the pseudo-velocity is delayed, a second gain applying step in which a second gain H2 is applied to the pseudo-velocity that is delayed by the delay step, and an input step in which a sum of the pseudo-velocity to which the first gain H1 is applied and the pseudo-velocity to which the second gain H2 is applied is inputted to a lowpass filter. When a transfer function in the proportional integration control operation is $F_a(z)$, and a transfer function of the lowpass filter is $F_b(z)$, "$F_a(z)=1/(1-z^{-1}F_b(z))$" is satisfied.

A servo control system in at least an embodiment of the present invention includes the servo control device in accordance with the present invention and a driver.

In accordance with at least an embodiment of the present invention, a delay means and a second gain means which are serially-connected with each other are added to a feedback gain means provided in the path where a velocity is fed back in a conventional PI control device and, in addition, a restriction is provided in the transfer function of the PI control means and the transfer function of the lowpass filter. As a result, while maintaining the robustness which is an advantage of "P-PI" control, a command response characteristic is capable of being easily adjusted to a desired characteristic and, in addition, the command response characteristic and the robustness can be adjusted independently.

In the servo control device described above, the PI control means may be configured in another format. In other words, it may be configured that a deviation between the pseudo-velocity inputted through the velocity feedback path and the position deviation is used as a drive command to the driver as it is, and a result obtained by subtracting the drive command from a sum of an output of the first gain means and an output of the second gain means is inputted to the lowpass filter. This structure is also mathematically equivalent to the above-mentioned servo control device and thus similar operations to the above-mentioned servo control device can be obtained. In addition, the PI control means is configured in another format and a feedback control function and a filter are shared and thus installation to the device becomes easy. Also in the servo control method described above, similarly, the proportional integration control operation can be realized in another format.

In at least an embodiment of the present invention, as an example, a transfer function $F_b(z)$ of the lowpass filter may be set as $F_b(z)=q_0z/(\delta+q_0)$ where $\delta=z-1$. According to the transfer function $F_b(z)$, a disturbance characteristic can be controlled independently from the position command response characteristic by using the integral parameter $q_0$. In addition, in at least an embodiment of the present invention, when a velocity proportional control gain when the driver is driven by the drive command is G, a transfer characteristic P(z) obtained by combining the driver and the operation object is modeled as $r_0z/(\delta^2+p_1)$, and a position command response characteristic from the position command to a command of the detected position is $m_0z/(\delta^2+m_1\delta+m_0)$, it may be expressed as follows.

$G=m_0/r_0$, $H_1=-(p_1-m_1+m_0-q_0)/(m_0q_0)$, and $H_2=\{(m_1-m_0)/m_0\}-H_1$.

When P(z) is modeled as described above, in a case that a desired position command response characteristic which is required in servo control is given, the respective gains G, $H_1$ and $H_2$ corresponding to the position command response characteristic can be easily determined.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
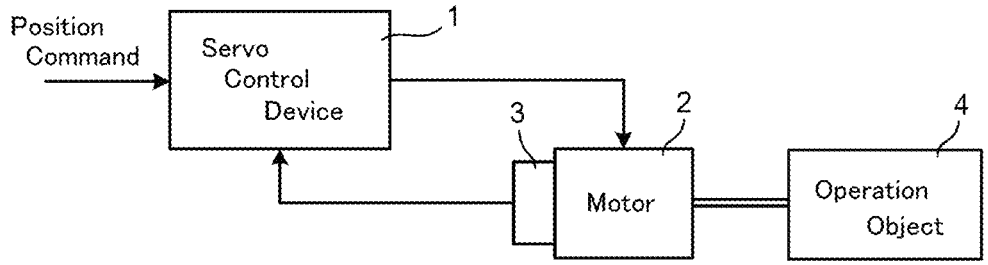
FIG. 1 is a block diagram showing a servo control system in accordance with an embodiment of the present invention.

A preferred embodiment of the present invention will be described below with reference to the accompanying drawings. FIG. 1 shows a structure of a servo control system in accordance with at least an embodiment of the present invention.

A servo control system in this embodiment includes a motor 2 which is mechanically connected with an operation object 4 to drive the operation object 4 and a servo control device 1 structured to control the motor 2. In this embodiment, the servo control system is described in which the motor 2 is controlled by the servo control device 1. However, the control object is not limited to a motor and, for example, a robot may be used as the control object. The motor 2 is, as an example, an AC servomotor or a DC servomotor, which drives the operation object 4 which is a load. The motor 2 is attached with a position detection mechanism 3 such as an encoder which is structured to detect a rotation position of the motor 2. The servo control device 1 executes control by a closed-loop system based on a position command, which is given from the outside, and a detected signal from the position detection mechanism 3 and drives the motor 2.

Figure 2:
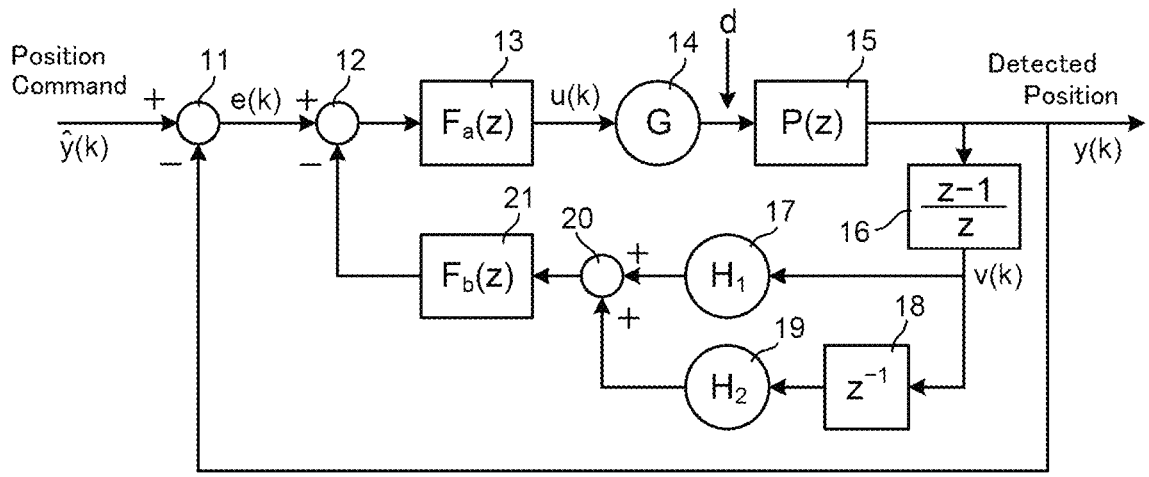
FIG. 2 is a block diagram showing a structure of a servo control system.

FIG. 2 is a block diagram showing a closed-loop system in which a rotation command to the motor 2 is an input and a position of the motor 2, in other words, a detected position detected by the position detection mechanism 3 is an output in the servo control system shown in FIG. 1. In this embodiment, a transfer function by z-transform in a discrete time system is used instead of using a transfer function by Laplace transform in a continuous time system so that the servo control device 1 can be structured by a microprocessor or the like. "z" is a leading operator in a discrete time system when the time series signal is expressed as a(1), a(2), . . . , a(k−1), a(k), a(k+1). The leading operator "z" is an operator which advances a time series signal one time point in a discrete time system as follows: $a(k+1)=z\,a(k)$. On the other hand, $z^{-1}$ is a delay operator which delays to immediately before one time point as follows: $a(k-1)=z^{-1}a(k)$. In FIG. 2, a transfer function of a control object element 15 comprised of the motor 2 and the operation object 4 is expressed by P(z). A detected position y(k) which is an output of the position detection mechanism 3 is outputted from the control object element 15. Therefore, in FIG. 2, elements other than the control object element 15 are included in the servo control device 1.

An operation to be executed by the servo control device 1 is to control driving of the motor 2 so that a rotation position of the motor 2, in other words, a detected position detected by the position detection mechanism 3 becomes y(k) for a position command $$\hat{y}(k)$$

which is inputted. In the servo control device 1, the detected position is negatively fed back to a summing point 11 to which the position command is inputted, and a position deviation e(k) is calculated in the summing point 11 according to the following expression (1), and the position deviation e(k) is given to a summing point 12.

$$e(k)=\hat{y}(k)-y(k) \quad (1)$$

An output of a lowpass filter 21 described below is negatively fed back to the summing point 12, and a calculation subtracting the output of the lowpass filter 21 from the position deviation e(k) is executed. The calculation result in the summing point 12 is given to a PI control part 13 which is a PI control means and whose transfer function is expressed by $F_a(z)$, and the PI control part 13 creates a drive command u(k). The drive command u(k) is also commonly referred to as a torque command. However, as long as a command is used for controlling an output of the motor 2, the drive command u(k) is not limited to a torque command. For enhancing a prospect of calculation, a variable δ which is "δ=z−1" is introduced. In this embodiment, a transfer function Fa(z) of the PI control part 13 is expressed by the following expression (2).

$$F_a(z)=(\delta+q_0)/\delta \quad (2)$$

"$q_0$" is one of integral parameters which characterize the system. The parameter $q_0$ is a coefficient of a primary low-pass filter defined by Fb(z) in a discrete time system, and a coefficient for determining the cut-off frequency of the filter. When used in the function Fa(z), the parameter $q_0$ is a coefficient expressing integration performance.

A driver circuit (not shown) which is provided inside the servo control device 1 or provided outside the servo control device 1 drives the motor 2 based on the command u(k). In the block diagram, the command u(k) is inputted to the control object element 15 through a speed control proportional gain element 14 where a speed control proportional gain expressed as "G" is applied. In following descriptions, it is assumed that the transfer function P(z) of the control object element 15 includes a contribution of the driver circuit. Disturbance "d" is also applied to the input to the control object element 15. When model parameters $m_0$ and $r_0$ are used, the "G" is expressed by the following expression (3).

$$G=m_0/r_0 \quad (3)$$

The value $m_0$ is a coefficient defined in the position command response characteristic from the position command to the detected position as follows:

$$(m_0z)/(z^2+(m_1-2)z+(1-m_1+m_0))$$

The position command response characteristic is a desired model characteristic to be matched. Additionally, this expression is related to the relation $\square=z^{-1}$.

The value $r_0$ is a numerator coefficient of the transfer function P(z) in a discrete time system obtained by modeling control object element 15, and expresses a gain of the entire control object.

The servo control device 1 further includes, for controlling the motor 2, a difference element 16 (i.e., difference circuit) in which a time difference of the detected position y(k) is obtained to output as a pseudo-velocity v(k), a first gain element 17 (i.e., first gain circuit) to which the pseudo-velocity v(k) is inputted, a delay element 18 (i.e., delay circuit) to which the pseudo-velocity v(k) is inputted, a second gain element 19 (i.e., second gain circuit) to which an output of the delay element 18 is inputted, a summing point 20 (i.e., summing circuit) in which an output of the first gain element 17 and an output of the second gain element 19 are summed, and a lowpass filter 21 to which a summed result of the summing point 20 is inputted. The difference element 16, the delay element 18, the first gain element 17 and the second gain element 19 respectively correspond to a difference means, a delay means, a first gain means and a second gain means. As described above, an output of the lowpass filter 21 is negatively fed back to the summing point 12, and a path from an output of the difference element 16 to the summing point 12 through the lowpass filter 21 is a velocity feedback path. In this embodiment, a transfer function of the difference element 16 is expressed as δ/z, and the delay element 18 is expressed as $z^{-1}$. Further, the transfer function $H_1$ of the first gain element 17 and the transfer function $H_2$ of the second gain element 18 are respectively expressed as the following expressions (4) and (5), and the transfer function $F_b(z)$ of the lowpass filter 21 is expressed as the following expression (6).

$$H_1=-(p_1-m_1+m_0-q_0)/(m_0q_0) \quad (4),$$

$$H_2=\{(m_1-m_0)/m_0\}-H_1 \quad (5),$$

$$F_b(z)=q_0z/(\delta+q_0) \quad (6).$$

Here, $p_1$ and $m_1$ are also model parameters.

The parameter $p_1$ is a coefficient of a denominator polynomial of the transfer function P(z) in a discrete time system obtained by modeling the control object element 15, and a coefficient defined by the characteristic polynomial of the control object P(z): $z^2+(p_1-2)z+(1-p_1)$. This is a coefficient regarding the frequency characteristic (pole of the transfer function) of the entire control object.

The parameter $m_1$ is a coefficient defined by the desired model characteristic similarly to the parameter $m_0$. Two poles in the transfer function of the desired position command frequency response characteristic to be matched are determined by the combination of $\{m_0, m_1\}$. In order to set the input and output gain as "1:1", the numerator is set as "$m_0$".

Next, the control object element 15 in this embodiment will be described below. When considered as a transfer function in a continuous time system using Laplace transform, in a case that the sum of inertia of the motor 2 and inertia of the operation object 4 is expressed as J, a parameter regarding viscosity of the motor 2 and the operation object 4 is expressed as c, and a gain is expressed as g, the control object element 15 comprised of the motor 2 including the driver circuit and the operation object 4 can be commonly modeled with $g/(Js^2+cs)$ and may be further modeled with $K/(s^2+\lambda s)$. This may be further simplified with $\lambda=0$. In this embodiment, digital control is performed by using a microprocessor or the like and thus $K/(s^2+\lambda s)$ is converted into a discrete time model to obtain $(b_1z+b_0)/(z^2+$ $a_1z+a_0$). This is further approximated to $(r_0z)/(\delta^2+p_1\delta)$. After all, in this embodiment, the control object element 15 is modeled so that P(z) of the transfer function is expressed as the following expression (7).

$$P(z)=r_0z/(\delta^2+p_1\delta) \quad (7)$$

Figure 3:
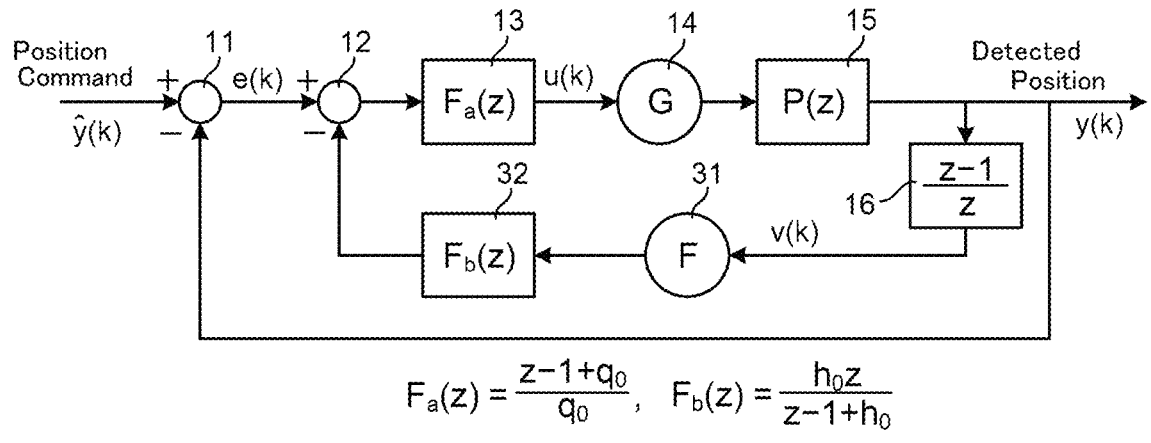
FIG. 3 is block diagram showing an example of a servo control system by "P-PI" control in a prior art.

Next, the servo control system in this embodiment will be further described in detail below while comparing with a common servo control system in a prior art. FIG. 3 is a block diagram showing a common servo control system which uses PI control in a prior art which is, for example, described in above-mentioned Patent Literatures 1 and 2. A hardware structure of the servo control system shown in FIG. 3 is also the same as the structure shown in FIG. 1. In order to easily compare with the structure shown in FIG. 2, the system is represented by a discrete time system in FIG. 3. Similarly to the system in this embodiment shown in FIG. 2, the system shown in FIG. 3 includes a summing point 11 to which a position command is inputted and a detected position y(k) of the motor 2 is negatively fed back to create a position deviation e(k), a summing point 12 to which the position deviation e(k) is inputted and an output of a lowpass filter 32 is negatively fed back, a PI control part 13 (i.e., a PI controller) to which a calculated result in the summing point 12 is inputted to create a drive command u(k), and a difference element 16 in which a time difference of the detected position y(k) is obtained to output a pseudo-velocity v(k). A command u(k) to which a speed control proportional gain G is applied is inputted to the control object element 15. A pseudo-velocity v(k) is inputted to the lowpass filter 32 after a velocity feedback gain F is multiplied by the velocity feedback gain element 31. In the conventional system shown in FIG. 3, the transfer function $F_a(z)$ of the PI control part 13 is expressed as the expression (2), but the transfer function $F_b(z)$ of the lowpass filter 32 is expressed as the following expression (8).

$$F_b(z)=h_0z/(\delta+h_0) \quad (8)$$

As understood by comparing FIG. 2 with FIG. 3, in the servo control system in this embodiment, the transfer function $F_b(z)$ of the lowpass filter 21 is expressed by the integral parameter $q_0$ included in the transfer function $F_a(z)$ of the PI control part 13. On the other hand, in the system shown in FIG. 3, the transfer function $F_b(z)$ of the lowpass filter 32 is expressed by the parameter $h_0$ which is not included in the transfer function $F_a(z)$ of the PI control part 13. Further, elements corresponding to the delay element 18 and the second gain element 19 which is provided in the subsequent stage of the delay element 18 and whose transfer function is expressed as $H_2$ in this embodiment are not provided in the conventional system shown in FIG. 3. In other words, in this embodiment, "$H_1+(H_2/z)$" is used instead of the velocity feedback gain F in the conventional system. In the servo control system in this embodiment, the same integral parameter $q_0$ is used for the transfer function $F_a(z)$ of the PI control part 13 and the transfer function $F_b(z)$ of the lowpass filter 21, and a path comprised of the delay element 18 and the second gain element 19 is added in the negative feedback path of the pseudo-velocity v(k). In addition, the above-mentioned restrictions are respectively applied to G, $H_1$ and $H_2$ and thus, the command response characteristic can be easily adjusted in a desired characteristic with an extremely simple structure where one path is added to the conventional system and, in addition, the command response characteristic and the robustness (disturbance characteristic) can be adjusted independently. Next, in the servo control system in this embodiment, reasons for obtaining these advantages will be described further in detail below.

When the transfer function P(z) of the control object element 15 is expressed by the expression (7), the following expressions (9) and (10) are obtained from the block diagram shown in FIG. 2.

$$y(k)=P(z)Gu(k) \quad (9)$$

$$v(k)=(\delta/z)y(k) \quad (10)$$

The following expression (11) is obtained from the expressions (9) and (10) and the expression (3).

$$v(k) = \frac{m_0}{\delta + p_1} u(k) \quad (11)$$

When an input of the lowpass filter 21 is expressed as w(k), the following expression (12) is obviously satisfied.

$$w(k) = \left(H_1 + \frac{H_2}{z}\right)v(k) = \left(\frac{(\delta+1)H_1}{z} + \frac{H_2}{z}\right)\left(\frac{m_0}{\delta + p_1}\right)u(k) \quad (12)$$

Further, the following expression (13) is satisfied regarding u(k) which is an output of the PI control part 13.

$$u(k)=F_a(z)\{e(k)-F_b(z)w(k)\} \quad (13)$$

Utilizing the relationship of the following expression (14) between $F_a(z)$ and $F_b(z)$, the expressions (2), (8) and (12) are assigned to the expression (13) and then, when the expressions (4) through (6) are further assigned, the following expression (15) is obtained. As a result, the following expression (16) in which u(k) is expressed by e(k) is obtained.

$$F_a(z) = \frac{\delta + q_0}{\delta} = \frac{1}{1 - \frac{q_0}{\delta + q_0}} = \frac{1}{1 - \frac{F_b(z)}{z}}, \quad (14)$$

$$u(k) = \frac{p_1 - m_1 + m_0}{\delta + p_1} u(k) + e(k), \quad (15)$$

$$u(k) = \frac{\delta + p_1}{\delta + m_1 - m_0} e(k) \quad (16)$$

When the expression (16) is assigned to the expression (11), the following expression (17) is obtained, and the following expression (18) is obtained by applying the expression (10) and the expression (1) to the expression (17).

$$v(k) = \frac{m_0}{\delta + m_1 - m_0} e(k), \quad (17)$$

$$\frac{\delta}{z}y(k) = \frac{m_0}{\delta + m_1 - m_0}\{\hat{y}(k) - y(k)\} \quad (18)$$

When the expression (18) is arranged, the following expression (19) is obtained.

$$y(k) = \frac{m_0 z}{\delta^2 + (m_1 - m_0)\delta + m_0 z}\hat{y}(k) = \frac{m_0 z}{\delta^2 + m_1\delta + m_0}\hat{y}(k) \quad (19)$$

The expression (19) indicates that, in the servo control system shown in FIG. 2, the position command response characteristic from a position command to a position detection is expressed by $(m_0 z)/(\delta^2 + m_1 \delta + m_0)$ and, although an integration function (in other words, disturbance response) can be adjusted by the integral parameter $q_0$, the position command response characteristic is not affected by the adjustment. In other words, the position control characteristic can be matched to the characteristic polynomial $\delta^2 + m_1 \delta + m_0$ regardless of a value of the $q_0$ which is a factor indicating integration in the PI control part 13 and the lowpass filter 21. Conversely, in a case that the control object element 15 is modeled as shown by the expression (7) and the position command response characteristic is modeled as shown by the expression (19), the optimum control can be performed by determining $F_a(z)$, $F_b(z)$, $G$, $H_1$ and $H_2$ as shown in the expressions (3) through (6) and (8).

Other Embodiments

Figures 4A, 4B:
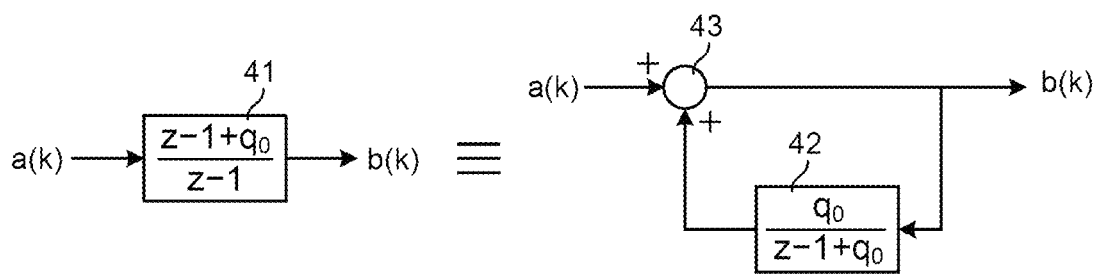
FIGS. 4A and 4B are explanatory block diagrams showing a structure equivalent to a PI control part.

Next, other embodiments in accordance with the present invention will be described below. A structure of PI control shown in FIG. 4A is provided with an element 41 whose transfer function is $\{(z-1)+q_0\}/(z-1)$ and, when a(k) is inputted into the element 41, b(k) is obtained. On the other hand, a structure shown in FIG. 4B is provided with an element 42 whose transfer function is $q_0/\{(z-1)+q_0\}$ and a summing point 43, and a(k) and an output of the element 42 are inputted to the summing point 43, and a summed result is b(k) and the b(k) is inputted to the element 42. The structure shown in FIG. 4B is represented as the following expression (20) and the following expression (21) is obtained.

$$b(k) = a(k) + \frac{q_0}{z-1+q_0} b(k), \quad (20)$$

$$b(k) = \frac{z-1+q_0}{z-1} a(k) \quad (21)$$

Figure 5:
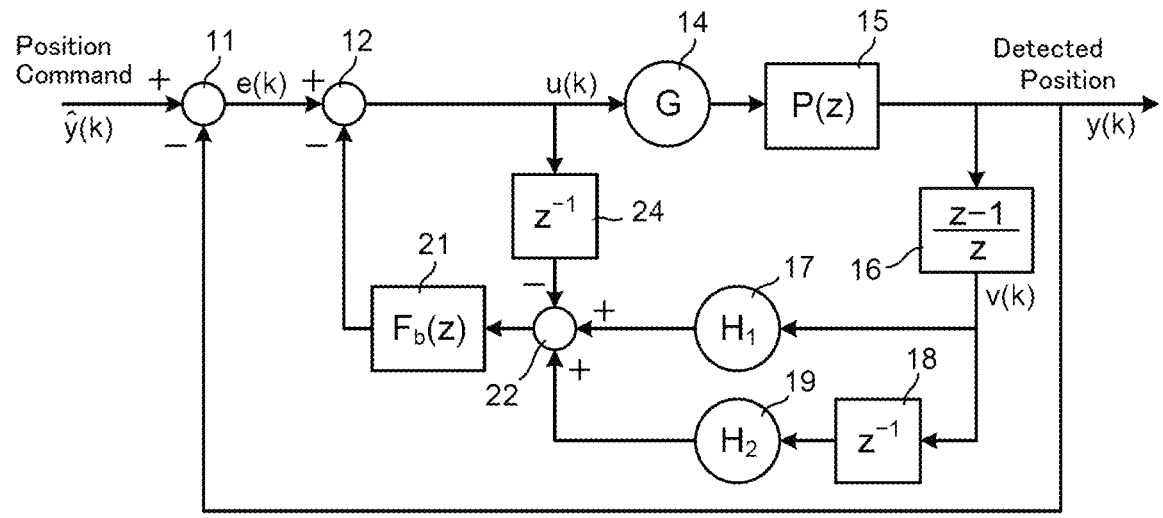
FIG. 5 is a block diagram showing a structure of a servo control system in accordance with another embodiment of the present invention.

This indicates that the structure shown in FIG. 4A and the structure shown in FIG. 4B are equivalent to each other. Further, since $\delta = z-1$, the transfer function of the element 41 is matched with the transfer function $F_a(z)$ of the PI control part 13 in FIG. 2, and the transfer function of the element 42 is matched with a product of the transfer function $F_b(z)$ of the lowpass filter 21 and a lead element z. Therefore, in the system shown by the block diagram in FIG. 2, a system which is structured so that an output of the summing point 12 is used as the drive command u(k) without providing the PI control part 13 and the u(k) is positively fed back to the summing point 12 through a delay element z−1 and the lowpass filter 21 is equivalent to the system shown in FIG. 2. FIG. 5 is a block diagram showing the equivalent system. In the system shown in FIG. 5, in order to input a delayed command u(k) to the lowpass filter 21, a delay element 24 whose transfer function is expressed as $z^{-1}$ and into which the command u(k) is inputted is provided and, in addition, instead of the summing point 20, a summing point 22 is provided in which an output of the first gain element 17 and an output of the second gain element 19 are added and an output of the delay element 24 is subtracted, and an output of the summing point 22 is inputted to the lowpass filter 21. In this embodiment, the delay elements 18 and 24 respectively correspond to the first delay means and the second delay means.

Figure 6:
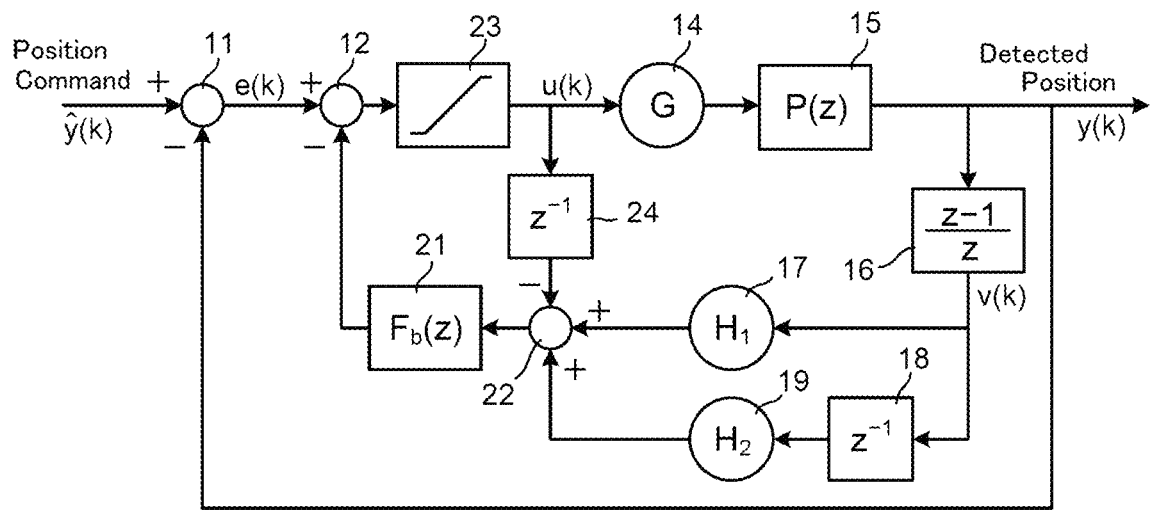
FIG. 6 is a block diagram showing a structure of a servo control system in accordance with another embodiment of the present invention.

In the system shown in FIG. 5, the PI control means is realized in another format and a feedback control function and a filter are shared. Therefore, in comparison with the system shown in FIG. 2, installation for realizing a servo control device with software by using, for example, a microcomputer, is easily performed. Further, in order to restrict an output of the motor 2, a limiter for limiting an amplitude of the command u(k) may be inserted in the servo control device. In a case that a limiter is provided in a subsequent stage of the PI control part where an integration operation is executed, a wind-up phenomenon that an output becomes unstable may be easily occurred. However, in the structure shown in FIG. 5, the PI control part is realized in a feedback format and thus a limiter can be easily inserted. In a system shown in FIG. 6, a limiter 23 is provided on the output side of the summing point 12 in the system shown in FIG. 5 and the command u(k) is limited by the limiter 23. The command u(k) which is limited by the limiter 23 is supplied to the speed proportional gain element 14 and is delayed by the delay element 24 to be supplied to the summing point 22.

The servo control devices 1 in the respective embodiments described above are operated in a discrete time system. Therefore, the respective elements of the summing points 11, 12 and 22, the PI control part 13, the speed control proportional gain element 14, the difference element 16, the first gain element 17, the delay elements 18 and 24, the second gain element 19, the lowpass filter 21 and the limiter 23 may be structured to be individual digital circuits which are operated according to appropriate clocks. However, the servo control device 1 in each of the embodiments can be realized by using a computer such as a microprocessor and by making the computer execute a computer program (software) for realizing the functions of the respective elements and executing their operations. Therefore, the scope of the invention embraces a computer realizing the servo control device 1 by executing on the computer such as a microprocessor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A servo control device structured to control a driver which operates an operation object on a basis of a position command and to execute an operation in a discrete time system, the servo control device comprising:
    a calculating means configured to calculate a position deviation based on the position command and a detected position which is negatively fed back;
    a velocity feedback path which comprises at least a difference means, which calculates a pseudo-velocity from the detected position, and a lowpass filter; and
    a PI control means configured to execute a proportional integration control operation on a deviation between the pseudo-velocity inputted through the velocity feedback path and the position deviation to create a drive command for the driver;

wherein the velocity feedback path further comprises:
a first gain means which applies a first gain H1 to the pseudo-velocity;
a delay means which delays the pseudo-velocity; and
a second gain means which applies a second gain H2 to the pseudo-velocity delayed by the delay means;
wherein a sum of an output of the first gain means and an output of the second gain means is inputted to the lowpass filter;

wherein the expression $Fa(z)=1/(1-z-1Fb(z))$ is satisfied;

where a transfer function of the PI control means is Fa(z), and a transfer function of the lowpass filter is Fb(z);
wherein "z" is a leading operator in the discrete time system;
z−1 is a delay operator;
"Fb(z)=q0z/(δ+q0)", where δ=z−1;
q0 is a coefficient of a primary low-pass filter defined by Fb(z) in a discrete time system;
when a velocity proportional control gain when the driver is driven by the drive command is G, a transfer function P(z) obtained by combining the driver and the operation object is modeled as r0z/(δ2+p1δ), and a position command response characteristic from the position command to the detected position is m0z/(δ2+m1δ+m0), $G=m0/r0,$ $H_1=-(p1-m1+m0-q0)/(m0q0),$ and $H_2=\{(m1-m0)/m0\}-H1;$ wherein r0 is a coefficient of the transfer function P(z) in a discrete time system obtained by modeling a control object element;
m0, m1 are coefficients; and
p1 is a coefficient of a denominator polynomial of the transfer function P(z) in a discrete time system obtained by modeling the control object element.

2. A servo control system comprising:
the servo control device defined in claim 1; and
the driver.

3. The servo control system according to claim 2, wherein "$F_b(z)=q_0z/(δ+q_0)$", where δ=z−1.

4. The servo control system according to claim 3, wherein
when a velocity proportional control gain when the driver is driven by the drive command is G, a transfer function P(z) obtained by combining the driver and the operation object is modeled as r0z/(δ2+p1δ), and a position command response characteristic from the position command to the detected position is m0z/(δ2+m1δ+m0), $G=m0/r0,$ $H1=-(p1-m1+m0-q0)/(m0q0),$ and $H2=\{(m1-m0)/m0\}-H1.$ 5. A servo control method configured to execute calculations in a discrete time system and to control a driver configured to operate an operation object on a basis of a position command, the servo control method comprising:
a calculation step in which a position deviation is calculated based on the position command and a detected position which is negatively fed back;

a feedback step in which a pseudo-velocity is calculated from the detected position by a difference operation to feed back the pseudo-velocity; and
a creation step in which a proportional integration control operation is executed on a deviation between the pseudo-velocity fed back and the position deviation to create a drive command for the driver;
wherein the feedback step comprises:
a first gain applying step in which a first gain H1 is applied to the pseudo-velocity;
a delay step in which the pseudo-velocity is delayed;
a second gain applying step in which a second gain H2 is applied to the pseudo-velocity which is delayed by the delay step; and
an input step in which a sum of the pseudo-velocity to which the first gain H1 is applied and the pseudo-velocity to which the second gain H2 is applied is inputted to a lowpass filter;
wherein "Fa(z)=1/(1−z−1Fb(z))" is satisfied; where a transfer function in the proportional integration control operation is Fa(z), and a transfer function of the lowpass filter is Fb(z),
"Fb(z)=q0z/(δ+q0)", where δ=z−1;
g0 is a coefficient of a primary low-pass filter defined by Fb(z) in the discrete time system;
when a velocity proportional control gain when the driver is driven by the drive command is G, a transfer characteristic P(z) obtained by combining the driver and the operation object is modeled as r0z/(δ2+p1δ), and a position command response characteristic from the position command to the detected position is m0z/(δ2+m1δ+m0), $G=m0/r0,$ $H1=-(p1-m1+m0-q0)/(m0q0),$ and $H2=\{(m1-m0)/m0\}-H1$ where r0 is a coefficient of the transfer function P(z) in the discrete time system obtained by modeling a control object element;
m0, m1 are coefficients; and
p1 is a coefficient of a denominator polynomial of the transfer function P(z) in the discrete time system obtained by modeling the control object element.

6. A servo control device structured to control a driver which operates an operation object on a basis of a position command and to execute an operation in a discrete time system, the servo control device comprising:
a calculating circuit configured to calculate a position deviation based on the position command and a detected position which is negatively fed back;
a velocity feedback path which comprises at least a difference circuit, which calculates a pseudo-velocity from the detected position, and a lowpass filter; and
a PI controller configured to execute a proportional integration control operation on a deviation between the pseudo-velocity inputted through the velocity feedback path and the position deviation to create a drive command for the driver;
wherein the velocity feedback path further comprises:
a first gain circuit which applies a first gain H1 to the pseudo-velocity;
a delay circuit which delays the pseudo-velocity; and
a second gain circuit which applies a second gain H2 to the pseudo-velocity delayed by the delay circuit;

wherein a sum of an output of the first gain circuit and an output of the second gain circuit is inputted to the lowpass filter; and wherein the expression $Fa(z)=1/(1-z-1Fb(z))$ is satisfied;

where a transfer function of the PI controller is Fa(z), and a transfer function of the lowpass filter is Fb(z);

wherein "z" is a leading operator in at the discrete time system; z−1 is a delay operator, "$Fb(z)=q0z/(\delta+q0)$", where $\delta=z-1$;

g0 is a coefficient of a primary low-pass filter defined by Fb(z) in the discrete time system;

when a velocity proportional control gain when the driver is driven by the drive command is G, a transfer characteristic P(z) obtained by combining the driver and the operation object is modeled as $r0z/(\delta2+p1\delta)$, and a position command response characteristic from the position command to the detected position is $m0z/(\delta2+m1\delta+m0)$, $G=m0/r0$, $H1=-(p1-m1+m0-q0)/(m0q0)$, and $H2=\{(m1-m0)/m0\}-H1$ where r0 is a coefficient of the transfer function P(z) in the discrete time system obtained by modeling a control object element;

m0, m1 are coefficients; and p1 is a coefficient of a denominator polynomial of the transfer function P(z) in the discrete time system obtained by modeling the control object element.

* * * * *